(12) United States Patent
Norrell

(10) Patent No.: US 6,507,608 B1
(45) Date of Patent: Jan. 14, 2003

(54) MULTI-LINE ADSL MODULATION

(75) Inventor: Andrew L. Norrell, Nevada City, CA (US)

(73) Assignee: 2Wire, Inc., San Jose, CA (US)

(*) Notice: Subject to any disclaimer, the term of this patent is extended or adjusted under 35 U.S.C. 154(b) by 23 days.

(21) Appl. No.: 09/791,970

(22) Filed: Feb. 22, 2001

Related U.S. Application Data

(60) Provisional application No. 60/184,225, filed on Feb. 23, 2000.

(51) Int. Cl.[7] ................................................ H04L 5/20
(52) U.S. Cl. ........................ 375/219; 375/258; 370/200
(58) Field of Search ................................. 375/219, 220, 375/222, 257, 258; 370/200, 357, 439, 366, 367, 513, 514; 379/93.01, 93.07, 93.09, 93.11, 100.12

(56) References Cited

U.S. PATENT DOCUMENTS

| | | | | |
|---|---|---|---|---|
| 4,024,359 A | * | 5/1977 | De Marco et al. | 379/22.02 |
| 4,024,360 A | * | 5/1977 | Biraghi et al. | 370/200 |
| 4,173,714 A | * | 11/1979 | Bloch et al. | 370/200 |
| 4,733,389 A | * | 3/1988 | Puvogel | 370/200 |
| 5,555,274 A | * | 9/1996 | Sheets | 370/200 |
| 5,901,205 A | * | 5/1999 | Smith et al. | 379/93.01 |
| 5,978,373 A | * | 11/1999 | Hoff et al. | 370/392 |
| 6,147,963 A | * | 11/2000 | Walker et al. | 370/200 |
| 6,295,323 B1 | * | 9/2001 | Gabara | 375/257 |

* cited by examiner

Primary Examiner—Chi Pham
Assistant Examiner—Khanh Cong Tran
(74) Attorney, Agent, or Firm—Carr & Ferrell, LLP

(57) ABSTRACT

A system and method are disclosed for transmitting data over multiple twisted pairs and receiving the data at a single receiver. In one embodiment, data is transmitted over an additional channel existing as the difference between the average voltages of two twisted pairs.

14 Claims, 4 Drawing Sheets

MULTI-LINE ADSL MODULATION

CROSS REFERENCE TO RELATED APPLICATION

This application relates to and claims the priority of commonly assigned U.S. Provisional Patent Application No. 60/184,225 filed on Feb. 23, 2000 and entitled "Multi-Line ADSL Modulation" by Andrew L. Norrell, the disclosure of which is hereby incorporated by reference.

BACKGROUND

1. Technical Field

The present system and method generally relate to data transmission technology, and more particularly to a system and method for delivering data over multiple twisted pair conductors.

2. Description of the Background Art

Digital Subscriber Line (DSL) technology has existed for several years. There are some significant competing broadband technologies, such as cable and satellite TV, and wireless technologies such as MMDS.and LMDS. Some implementations of these competitive services may be better suited to so-called Video-On-Demand (VOD) services than current DSL technology, but not well suited to traditional data communications or even interactive voice and video applications, where DSL may have the advantage of greater upstream bandwidth and lower latency.

Hence, there is a need to improve DSL technology data rates so as to potentially deliver such services as VOD in an effective manner: DSL service providers, therefore, generally need to increase the data rate by about a factor of two to provide VOD services to a large percentage of their customers. Preferably, this goal may be accomplished without making significant changes to the loop plant.

As those skilled in the art will appreciate, a common implementation of ADSL uses the frequency range from about 30 to 1100 kHz for both downstream (central office to customer premises) and upstream (customer premises to central office) transmissions. Most systems use band separation, with 138–1100 kHz for downstream and 30–120 kHz for upstream. The low frequencies from 0–30 kHz are reserved for Plain Old Telephone Service (POTS), although POTS signals typically reside below about 4 kHz.

The range of frequencies actually used for downstream transmission depends on the length and composition of the particular loop in question. A filter (POTS splitter) is installed at the NID to separate POTS frequencies from ADSL frequencies. The higher frequency content is directed to an ADSL modem via dedicated wires from the POTS splitter.

ADSL modem performance may be limited by several factors: cable attenuation, gaussian noise, Near End Crosstalk (NEXT), Far End Crosstalk (FEXT), impulse noise, dispersion, and other factors. Additional details regarding ADSL technology are know to hose skilled in the art and may be found in ADSL. *Standards Implementation, and Architecture* by Charles K. Summers, June 1999 ISBN 084939595X, the disclosure of which is hereby incorporated by this reference.

Video on Demand service typically requires at least 2 mbps per channel, and it is desirable to deliver at least two independent channels per customer premises. It is also desirable to deliver Voice over ADSL (VoDSL) and reasonably fast Internet access over the same system. Therefore, a need exists for a DSL service with a data rate of about 5 mbps or more.

SUMMARY

The present system and method generally provide data service over a multiple twisted pair conductors. In one embodiment, DSL signals are transmitted from a single transmitter to a single receiver over multiple local loops. Providing DSL service to a single CPE device over multiple loops, data rates significantly higher than those associated with single-loop transmissions are attainable.

Pursuant to another aspect of the present system and method, signals, such as DSL signals, are transmitted over an additional channel defined by the difference in average voltage between first and second twisted pairs. That is, in addition to transmitting data over the first and second twisted pair conductors, data is also transmitted over an additional channel defined by the difference in average voltage between the two pairs, thereby permitting yet additional data transmission capacity.

In one embodiment, a system is provided for transmitting signals over first and second twisted pairs. The system includes a transceiver having first and second line receivers and a line driver. A first transformer is disposed between the first twisted pair and the first line receiver, a second transformer is disposed between the second twisted pair and the second line receiver, and a third transformer is disposed between center taps of the first and second transformers and the line driver. This configuration permits the line driver to transmit signals over a channel existing between the average voltage of the first pair and the average voltage of the second pair.

Conventionally, many buildings, such as houses, have multi-pair cable from a pole to a Network Interface Device (NID) at the house. A large percentage of houses with Internet access already have at least two complete circuits from the central office to the house. According to one embodiment of the present system and method, the two circuits from the central office to the customer premises are generally viewed as a single multi-dimensional medium. Those skilled in the art will appreciate that the system and method described herein logically extend to numbers of circuits greater than two also.

Suppose, for example, that a telephone company customer currently has two copper loops from the central office to customer premises, both being used as POTS lines, one for dial-up Internet access, the other for voice service. This customer could be given two pair DSL—that is a DSL method that simultaneously drives both lines from both directions, with each pair being considered an independent dimension in a multi-dimension modulation scheme. A simple example would be a QAM mapping where the real part of the symbol is mapped to pair 1, the imaginary part of the symbol is mapped to pair 2.

Another example involves Discrete MultiTone Modulation (DMT), used in the above mentioned standard. As those skilled in the art are aware, G.992.1 generates and modulates 256 independent carriers that are spaced by 4312.5 Hz from DC to 1104 kHz. The POTS splitters, separation of downstream and upstream bands, and other considerations reduce the effective number of carriers to about 220 maximum. These carriers are generally capable of carrying up to 15 bits each, or a maximum possible rate of $15*4312.5*220 \cong 14.25$ mbps. In practice, 15 bits/carrier may be difficult if not impossible to attain. Instead, 8–10 mbps may be a more realistic limit for short loops, largely due to hardware limitations.

According to another aspect of the present system and method, an ADSL modem is designed to drive two lines simultaneously, thereby potentially doubling speed for the same capacity per carrier. The "complex" channel can support both positive and negative frequencies, so the medium can support 512 maximum active carriers under the same conditions that will support 256 maximum active carriers in current ADSL. Of course, the same band separation issues still apply—the need for POTS isolation and upstream/downstream frequency separation, so the actual number of active carriers is reduced by some percentage in both cases.

Some advantages associated with some embodiments of the present system and method are as follows. NEXT and FEXT between these two pairs are cancelable because the interferers are from the same encoder. This improves performance relative to two separate modulators independently driving two pairs. Moreover, POTS splitters may no longer be required if VoDSL is assumed—a big obstacle to deployment of current ADSL. This may reduce the need for truck rolls. The telephony services are delivered as a data application on the common ADSL channel. This frees up 30 kHz of additional bandwidth on each pair, equivalent to as much as 600 kbps or so in data capacity.

Additionally, the additional channel, referred to herein as a "phantom", or "virtual" channel, that exists as the difference between the average voltage of pair one and the average voltage of pair two may have more bandwidth than either the $1^{st}$ or $2^{nd}$ pair taken individually. There is about half as much resistance per unit length, and less capacitance per unit length also. This virtual channel may be accessed via transformer center taps at each end of the loops.

Importantly, the phantom, or virtual, channel may be a significant benefit. For example the virtual channel could be used for the upstream channel, thereby freeing the downstream channels to use more available bandwidth, which would improve reach significantly. Indeed, as an example, a typical 18 KFT line can support approximately 300–500 kbps downstream. The region from about 30–138 kHz, if available to the downstream, would add about an additional 300–1000 kbps per wire pair for a total of about 600–2000 kbps. Yet an additional benefit of one embodiment of the virtual channel is the reduced need for echo cancellers in the ADSL transceivers.

Other advantages and features of the present invention will be apparent from the drawings and detailed description as set forth below.

DETAILED DESCRIPTION

Figure 1:
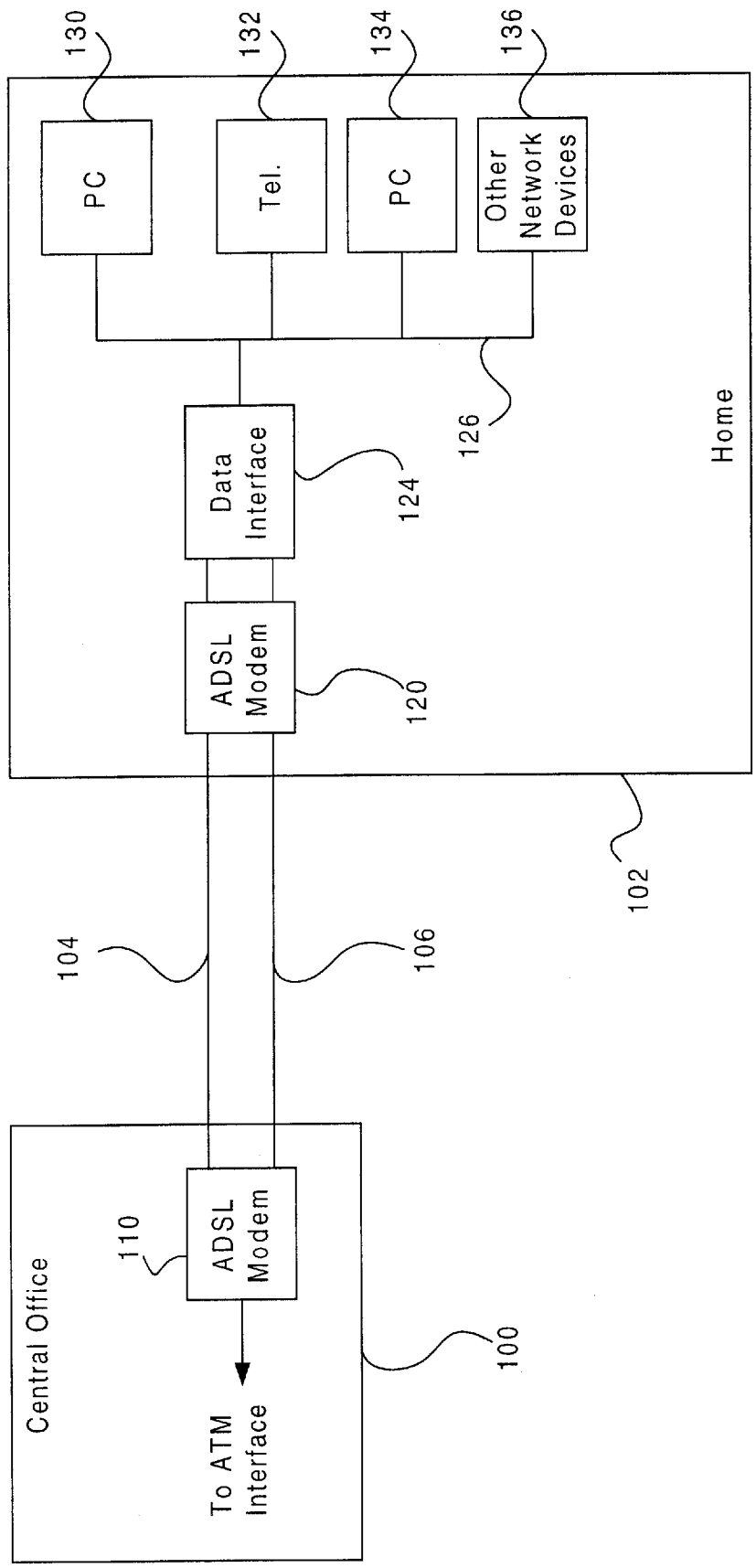
FIG. 1 is a block diagram of a central office and a customer premises, or home, coupled by two local loops.
Figure 2:
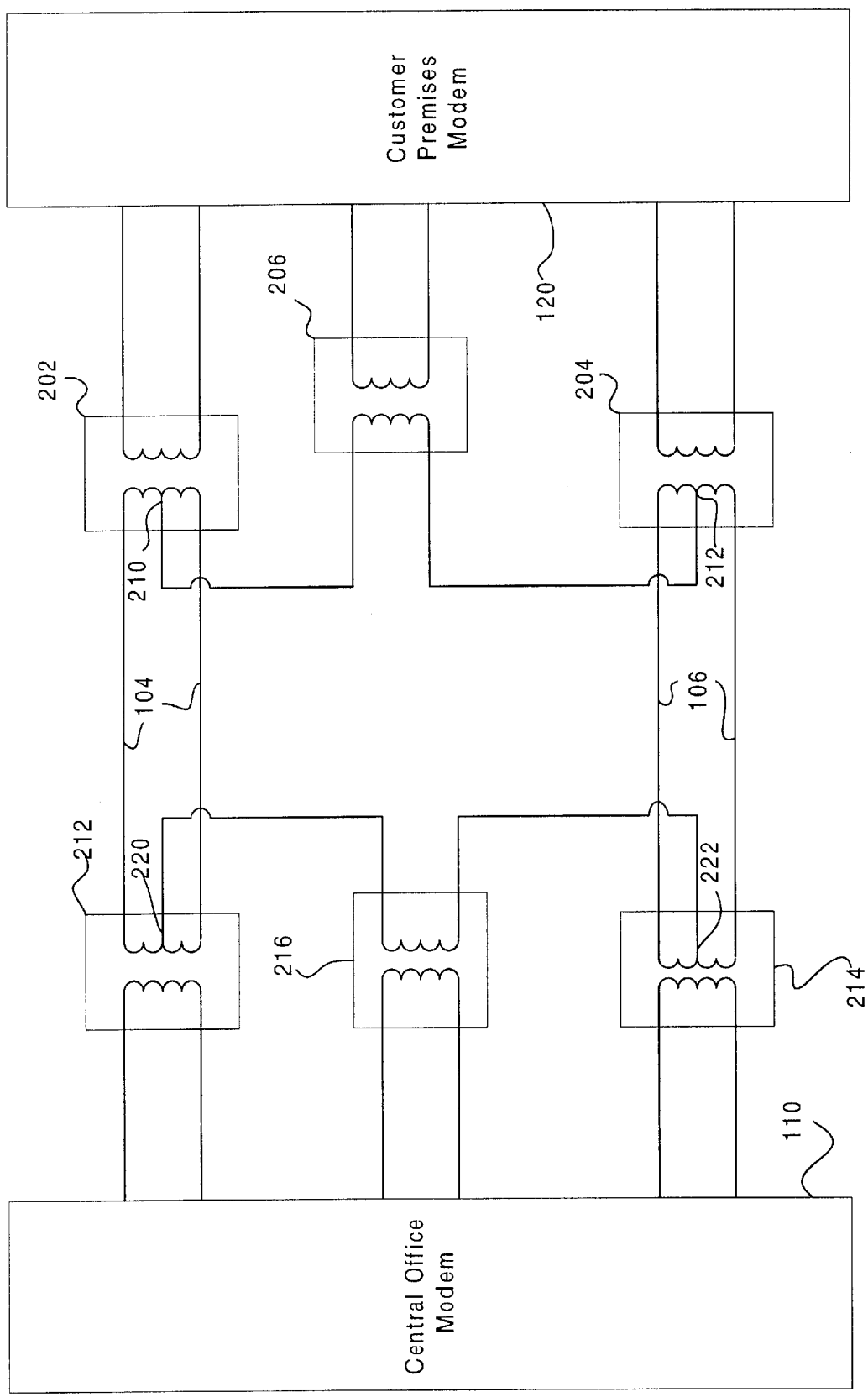
FIG. 2 illustrates details of the local loops, the central office modem, and the customer premises modem of FIG. 1.
Figure 4:
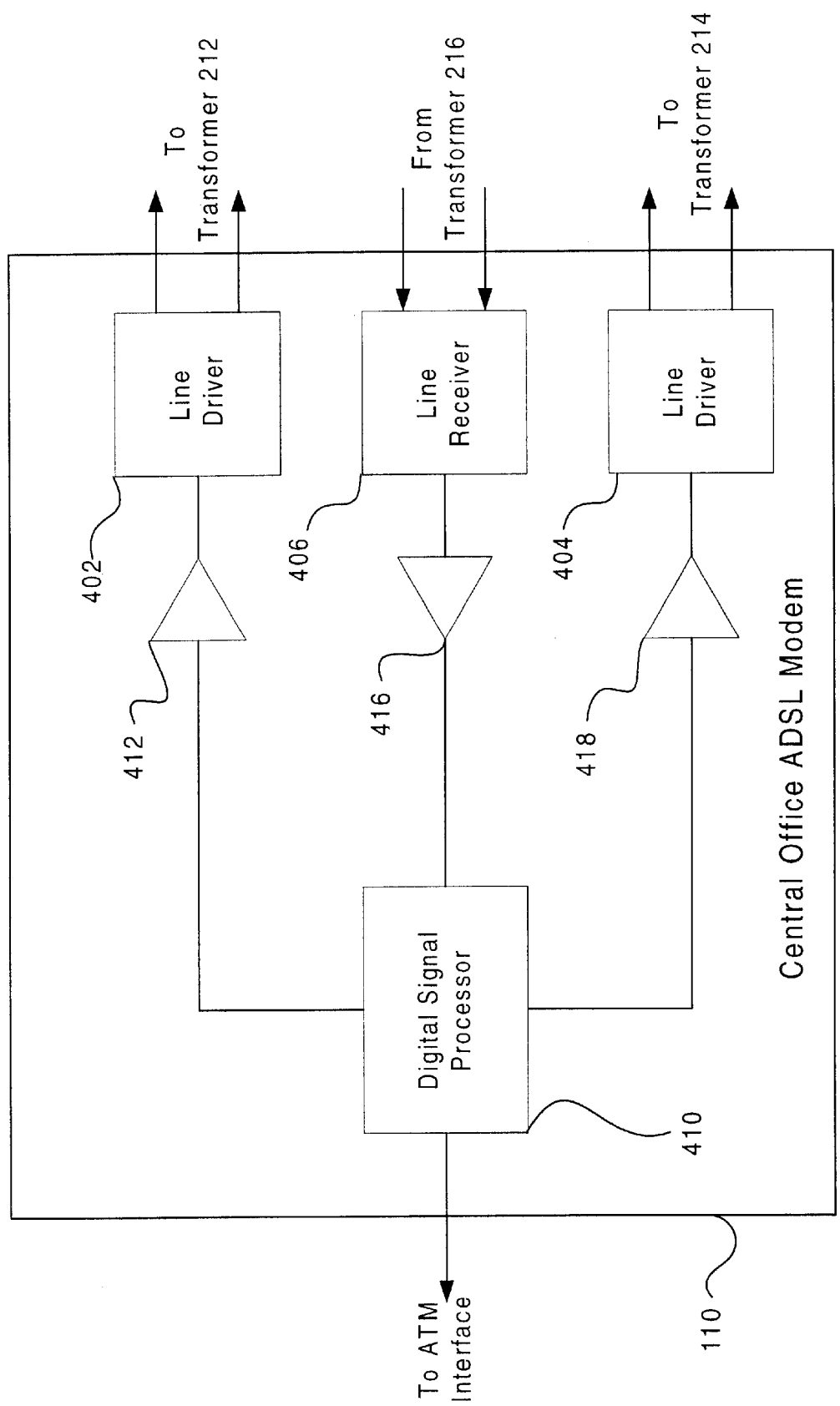
FIG. 4 illustrates details of one embodiment of the central office modem of FIG. 1.

FIG. 1 illustrates a central office 100 coupled to a building, such as a home 102, by a first twisted pair 104 and a second twisted pair 106. As shown, the central office 100 includes a central office ADSL modem 110 (ATU-C) coupled to the first and second twisted pairs 104 and 106 and interfaces the first and second twisted pairs with an ATM interface (not shown). Details of the central office ADSL modem 110 are shown in FIGS. 2 and 4 and are discussed below.

Figure 3:
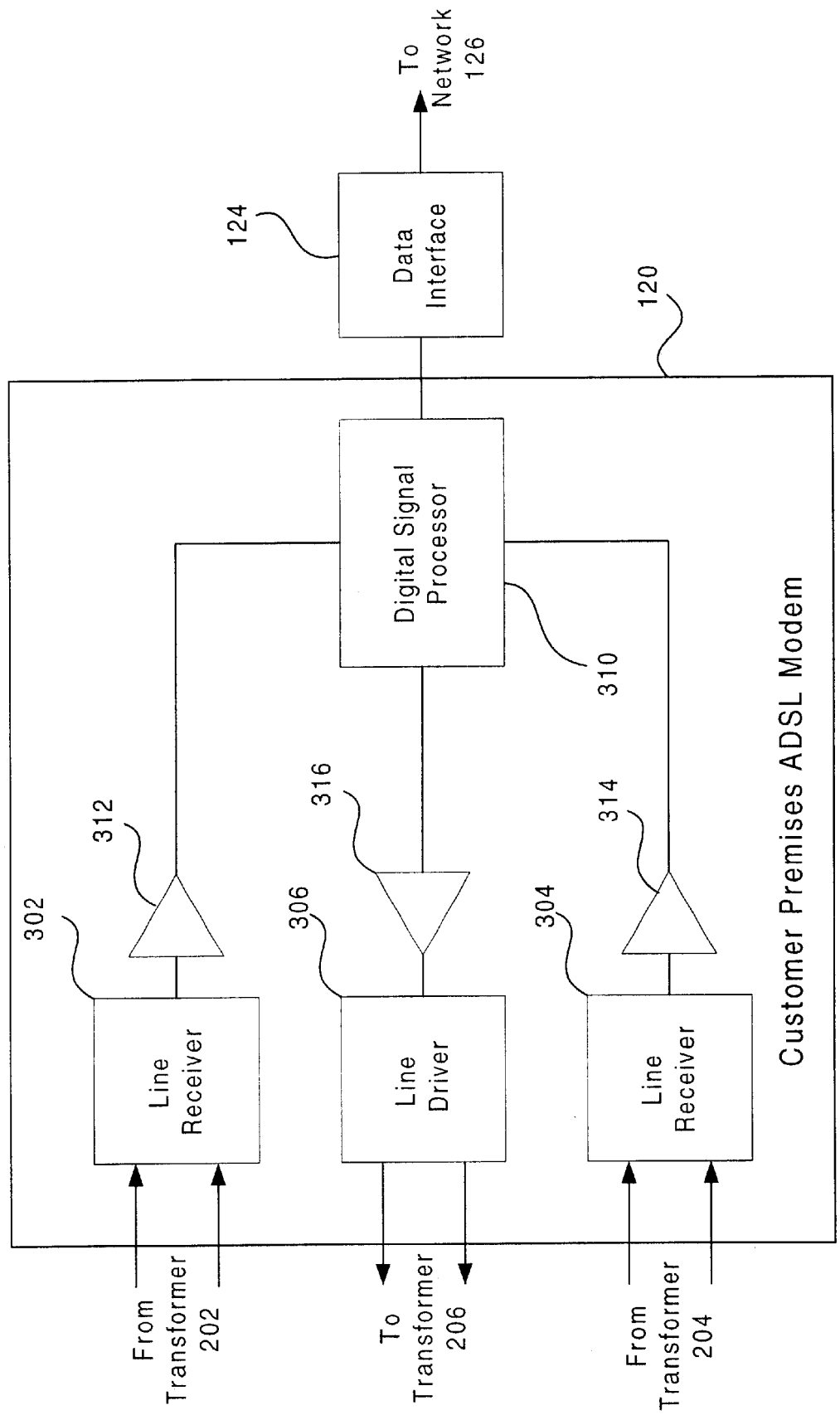
FIG. 3 illustrates details of one embodiment of the customer premises modem of FIG. 1.

The home 102 includes a customer premises ADSL modem 120 (ATU-R) coupled to the first and second twisted pairs 104 and 106. Details of the ADSL modem 120 are illustrated in FIGS. 2 and 3 and are discussed below.

The home 102 also includes a data interface 124 to interface the ADSL modem 120 with a single device, or multiple devices on a home network 126. The data interface 124 may comprise a HomePNA (Home Phoneline Networking Alliance) interface, an Ethernet interface, a PCI interface, or the like. Moreover, the home network 126 may comprise, for example, a home telephone copper wiring network. As shown, the home network 126 may have various network devices coupled thereto, such as a personal computer 130, a telephone 132, a personal computer 134, or other network device 136, such as printers, facsimile machines and the like.

In one embodiment, the central office 100 provides ADSL service to the home 102 over both the first and second twisted pairs 104 and 106. Those skilled in the art appreciate that by the addition of POTS, or low-pass, filters at the central office 100 and at the home 102, the central office 100 may also provide POTS service to the home 102 over the first twisted pair 104, the second twisted pair, or both.

Further, according to another embodiment, the central office 100 provides ADSL service to the home over pair 104, pair 106, and over a virtual channel defined by the difference in average voltage between the first and second twisted pairs 104 and 106. Details of this embodiment are described in more detail below.

FIG. 2 illustrates details of the central office modem 110, the customer premises modem 120, and the first and second twisted pairs 104 and 106 of FIG. 1. As shown, the customer premises modem 120 is coupled to the twisted pair 104 via transformer 202 and is coupled to twisted pair 106 via transformer 204. A transformer 206 is coupled to center taps 210 and 212 of the windings of the transformers 202 and 204 respectively to create a third, phantom or virtual, line defined by the difference in average voltage between the pairs 104 and 106. In this configuration, the twisted pairs 104 and 106 may be used for downstream communications while upstream communications are transmitted via the phantom or virtual line.

The phantom, or virtual, channel exists as the difference between the average voltage of the twisted pair 104 and the average voltage of the twisted pair 106. This channel may have more bandwidth than the twisted pair 104 or the twisted pair 106. There is about half as much resistance per unit length on the virtual channel than on either pair 104 or on pair 106. Moreover, there is also less capacitance per unit length on the virtual channel than on either pair 104 or 106. Resistance and capacitance per unit length are two parameters that have a major effect on cable loss in the range of frequencies used for ADSL. The phantom, or virtual, channel is accessed via the transformer center taps 210 and 212 at each end of the loops, or pairs 104 and 106. Those skilled in the art will appreciate that the transformers 202, 204, and 206 may be disposed internal or external to the customer premises modem 120.

Similarly, the central office modem 110 is coupled to or includes transformers 212, 214, and 216. The transformer 212 interfaces the central office modem 110 with the twisted pair 104 for downstream transmissions. The transformer 214 interfaces the central office modem 110 with the twisted pair 106 for downstream transmissions. The transformer 216, however, couples the central office modem 110 with center taps 220 and 222 of the transformers 212 and 214 respectively for upstream transmissions on the third, phantom, or virtual, channel described above. Those skilled in the art will appreciate that the transformers 212, 214, and 216 may be disposed internal or external to the central office modem 110.

Thus, in the embodiment illustrated in FIG. 2, the central office modem 110 and the customer premises modem 120 communicate over the twisted pair 104, the twisted pair 106, and a virtual line, or channel, defined by the difference in average voltage between the pair 104 and the pair 106. In one embodiment, downstream communications travel on the loops 104 and 106 via the transformers 202, 212, 204, and 214 and upstream communications traverse the loops 104 and 106 via the transformers 206 and 216.

FIG. 3 illustrates details of one embodiment of the customer premises ADSL modem 120. As shown, the modem 120 includes a line receiver 302, a line receiver 304, and a line driver 306 coupled to a digital signal processor 310. In particular, the line receiver 302 is coupled to the transformer 202 to receive downstream signals from the twisted pair 104 (FIG. 2) and to send the received signals to the digital signal processor 310 via an analog to digital converter 312. Similarly, the line receiver 304 is coupled to the transformer 204 to receive downstream signals from the twisted pair 106 (FIG. 2) and to send the received signals to the digital signal processor 310 via an analog to digital converter 314.

The line driver 306 is coupled to the transformer 206 of FIG. 2 to transmit upstream signals over the phantom, or virtual, channel described above. The digital signal processor 310 sends the upstream signals to the line driver 306 via a digital to analog converter 316. Lastly, the digital signal processor 310 is coupled to the data interface 124 described above with reference to FIG. 1 for exchanging data with the network 126. Those skilled in the art will appreciate that the data interface 124 may be disposed internal or external to the modem 120.

FIG. 4 illustrates details of one embodiment of the central office ADSL modem 110. As shown, the central office ADSL modem 110 includes a line driver 402, a line driver 404, and a line receiver 406 coupled to a digital signal processor 410. The line driver 402 is coupled to the transformer 212 (FIG. 2) for transmitting downstream signals over the twisted pair 104. The line driver 404 is coupled to the transformer 214 (FIG. 2) for transmitting downstream signals over the twisted pair 106. The line receiver 406 is coupled to the transformer 216 (FIG. 2) for receiving upstream signals from the virtual, or phantom, channel described above.

The digital signal processor 410 sends downstream data signals to the line drivers 402 and 404 via digital to analog converters 412 and 414. Similarly, the digital signal processor 410 receives upstream signals from the line receiver 406 via analog to digital converter 416. As described above, the central office ADSL modem 110 is also coupled to the ATM interface (not shown).

Those skilled in the art will appreciate the existence of alternative embodiments. One of these embodiments relates to multi-dimensional modulation, which is used in V.34 modem technology. The resulting waveform is one-dimensional. Gigabit copper Ethernet PHY drives 4 pairs of a CAT-5 cable simultaneously to achieve 1000 mbps. The encoder produces 4 simultaneous PAM impulses per symbol. Conventionally, there is no phantom, or virtual, channel signaling, even though this might be one of the easiest mediums to characterize for this purpose. Speeds faster than 1000 mbps might be possible with this technique. Pursuant to the teachings herein, there are potentially 4!/(2*2!)=6 such channel in CAT-5 (category 5) cable. Accordingly, creating phantom, or virtual, channels as described above, will significantly increase the data transfer rate in CAT-5 cable.

Similarly, SLIC-96 huts are often driven with 5-4wire T1 circuits (4 active and one spare). The 10 wire pairs could be driven collectively with multi-dimensional modulation, including phantom signaling, to deliver substantially higher data rates than 4*1.544 mbps currently achieved. This could obviate the need for expensive fiber installation, and lower the cost of ADSL deployment. Again, by creating phantom or virtual channels as described above, significant increases in data rates are possible.

Some difficulties associated with the creation and use of the phantom or virtual channels described above may exist. For example, the two pairs to a given location may have different lengths, bridge tap profiles, etc. These problems can be mitigated with conventional adaptive signal processing algorithms. Local Exchange Carriers may need engineering and deployment rules before offering this type of service. Further, RFI/EMI concerns might restrict use to cases where both pairs are in a single binder group.

In addition, the medium may need to be characterized prior to product development. As mentioned above, RFI and EMI concerns may limit effective capacity in some cases. The phantom, or virtual channel capacity may impose a performance cost on the downstream. For example, suppose the virtual channel in a hypothetical two pair ADSL system can achieve adequate signaling rates for the application with 10 DB less power than downstream transmitters. Downstream transmitters may need to reduce power to compensate, with some reduction in data rate. Lastly, imperfect commonmode-rejection of transformers on primary pairs could create interference between primary pairs and virtual channels.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method of transmitting data over multiple twisted pairs, the method comprising:
   transmitting Digital Subscriber Line (DSL) signals over a first twisted pair;
   transmitting DSL signals over a second twisted pair;
   creating an additional channel defined by the difference in average voltage between the first and second twisted pairs; and
   transmitting DSL signals over the additional channel.

2. The method of transmitting data over multiple twisted pairs according to claim 1, wherein downstream signals are transmitted over the first and second pairs and upstream signals are transmitted over the additional channel.

3. The method of transmitting data over multiple twisted pairs according to claim 1, wherein real portions of transmited signals are transmitted over the first pair and imaginary portions of transmitted signals are transmitted over the second pair.

4. The method of transmitting data over multiple twisted pairs according to claim 1, wherein the transmitted data passes between an ATU-R and an ATU-C over the first and second pairs.

5. A system for transmitting signals over first and second twisted pairs, the system comprising:

a transceiver having first and second line receivers and a line driver;

a first transformer disposed between the first twisted pair and the first line receiver;

a second transformer disposed between the second twisted pair and the second line receiver; and a third transformer disposed between center taps of the first and second transformers and the line driver to permit the line driver to transmit signals over a channel existing between the average voltage of the first pair and the average voltage of the second pair.

6. The system for transmitting signals according to claim 5 wherein the transceiver further comprises an ATU-R.

7. The system for transmitting signals according to claim 5 wherein the signals further comprise ADSL signals.

8. A system for transmitting signals over first and second twisted pairs, the system comprising:

a transceiver having first and second line drivers and a line receiver;

a first transformer disposed between the first twisted pair and the first line driver;

a second transformer disposed between the second twisted pair and the second line driver; and a third transformer disposed between center taps of the first and second transformers and the line receiver to permit the line receiver to receive signals over a channel existing between the average voltage of the first pair and the average voltage of the second pair.

9. The system for transmitting signals according to claim 8 wherein the transceiver further comprises an ATU.

10. The system for transmitting signals according to claim 8 wherein the signals further comprise ADSL signals.

11. A system for transmitting ADSL signals between an ATU-R and an ATU-C over first and second twisted pairs, the system comprising:

an ATU-R having first and second ATU-R line receivers and an ATU-R line driver;

a first transformer disposed between the first twisted pair and the first ATU-R line receiver;

a second transformer disposed between the second twisted pair and the second ATU-R line receiver; and a third transformer disposed between center taps of the first and second transformers and the ATU-R line driver to permit the ATU-R line driver to transmit signals over a channel existing between the average voltage of the first pair and the average voltage of the second pair;

an ATU-C having first and second ATU-C line drivers and an ATU-C line receiver;

a fourth transformer disposed between the first twisted pair and the first ATU-C line driver;

a fifth transformer disposed between the second twisted pair and the second ATU-C line driver; and a sixth transformer disposed between center taps of the fourth and fifth transformers and the ATU-C line receiver to permit the ATU-C line receiver to receive signals over the channel existing between the average voltage of the first pair and the average voltage of the second pair.

12. A method of transmitting data symbols over first and second twisted pair conductors, the method comprising:

dividing each data symbol to be transmitted into real and imaginary components;

transmitting the real component of each data symbol over the first twisted pair conductor with a transmitter;

transmitting the imaginary component of each data symbol over the second twisted pair with the transmitter.

13. A system for transmitting data over multiple twisted pairs, the system comprising:

means for transmitting DSL signals over a first twisted pair;

means for transmitting DSL signals over a second twisted pair;

means for creating an additional channel defined by the difference in average voltage between the first and second twisted pairs; and means for transmitting DSL signals over the additional channel.

14. An ADSL transceiver comprising:

a first line driver coupled to a first twisted pair for transmitting ASDL signals onto the first twisted pair;

a second line driver coupled to a second twisted pair for transmitting ADSL signals onto the second twisted pair;

a line receiver coupled to an additional channel, defined by the difference in average voltage between the first and second twisted pairs, for receiving ASDL signals from the additional channel, the first and second line drivers and the line receiver being controlled by one digital signal processor.

* * * * *

UNITED STATES PATENT AND TRADEMARK OFFICE
CERTIFICATE OF CORRECTION

| | | |
|---|---|---|
| PATENT NO. | : 6,507,608 B1 | Page 1 of 1 |
| APPLICATION NO. | : 09/791970 | |
| DATED | : January 14, 2003 | |
| INVENTOR(S) | : Andrew L. Norrell | |

It is certified that error appears in the above-identified patent and that said Letters Patent is hereby corrected as shown below:

Column 7
Line 30, "ATU" should be replaced with --ATU-C--.

Signed and Sealed this
Twenty-sixth Day of June, 2012

David J. Kappos
*Director of the United States Patent and Trademark Office*